(12) United States Patent
Tzara

(10) Patent No.: US 8,301,675 B2
(45) Date of Patent: Oct. 30, 2012

(54) COMPUTER SYSTEM FOR PREDICTING THE EVOLUTION OF A CHRONOLOGICAL SET OF NUMERICAL VALUES

(76) Inventor: Wally Tzara, Paris (FR)

(*) Notice: Subject to any disclaimer, the term of this patent is extended or adjusted under 35 U.S.C. 154(b) by 1329 days.

(21) Appl. No.: 11/988,624

(22) PCT Filed: Jul. 7, 2006

(86) PCT No.: PCT/FR2006/001639
§ 371 (c)(1), (2), (4) Date: Jan. 11, 2008

(87) PCT Pub. No.: WO2007/006943
PCT Pub. Date: Jan. 18, 2007

(65) Prior Publication Data
US 2009/0172057 A1    Jul. 2, 2009

Related U.S. Application Data

(63) Continuation-in-part of application No. 11/178,533, filed on Jul. 12, 2005, now abandoned.

(51) Int. Cl.
*G06F 1/02* (2006.01)

(52) U.S. Cl. ........................................ 708/274
(58) Field of Classification Search .............. 708/274
See application file for complete search history.

(56) References Cited

U.S. PATENT DOCUMENTS

| 5,519,647 A * | 5/1996 | DeVille | 708/276 |
| 2004/0195500 A1* | 10/2004 | Sachs et al. | 250/282 |
| 2007/0023633 A1* | 2/2007 | Wang et al. | 250/282 |

FOREIGN PATENT DOCUMENTS

| JP | 11-175503 A | 7/1999 |
| JP | 2002-183648 A | 6/2002 |

* cited by examiner

*Primary Examiner* — Tan V. Mai
(74) *Attorney, Agent, or Firm* — Christie, Parker & Hale, LLP

(57) ABSTRACT

The invention relates to a computer system for assisting prediction of the future of a chronological set (J) of numerical values which are stored in the memory (H) of a computer (O), such as to enable the generation of a topological structure, which can be displayed (V), using an algorithm-based analyzer (A). The topological structure comprises a dense network of regression-based curves in which characteristic figures, which can be used for prediction (P) purposes, can manifest.

14 Claims, 3 Drawing Sheets

COMPUTER SYSTEM FOR PREDICTING THE EVOLUTION OF A CHRONOLOGICAL SET OF NUMERICAL VALUES

CROSS-REFERENCE TO RELATED APPLICATION

This application is a National Phase Patent Application of International Application Number PCT/FR2006/001639, filed on Jul. 7, 2006, which claims priority is a continuation-in-part of U.S. patent application Ser. No. 11/178,533, filed on Jul. 12, 2005, now abandoned.

The present invention relates to a computer system for assisting prediction.

Such a system can be considered as comprising a topological structure relating to a chronological set of numerical values allowing the prediction of how new values will subsequently add on to the said set.

At present, simple computer systems do not allow the reliable prediction of the future of a chronological set of values. The proposed system allows prediction of the future of a chronological set of values with a high degree of confidence using inexpensive computer resources.

The system comprises a computer, a display screen or another display device, and allows execution of the followings steps, detailed later on:

Storage of a chronological set of numerical values (memory);
Application of an algorithm to this set of values (analyzer);
Generation of an image containing the representation of a chronological set of values and the topological structure relating to the said set (analyzer);
Display of the said image ((visual) display unit);
Examination of the characteristic figures of the topological structure;
Prediction of the future of the chronological set of values through the analysis of the said structure.

The system also comprises a procedure for assisting prediction using a fictitious prolongation of the chronological set of values.

Figure 1:
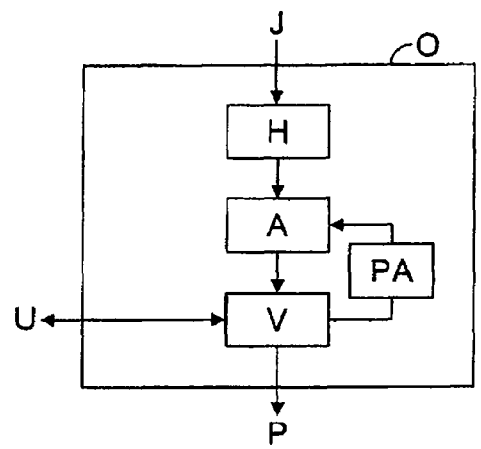
FIG. 1 illustrates schematically the structure of the system. O, J, H, A, V, U, PA and P represent respectively the computer, the chronological set of numerical values, the memory, the analyzer, the display unit, the user, the procedure for assisting prediction, and the prediction.

The chronological set of values J is loaded into the central memory H of a computer O or on one of its storage units from a storage medium, for example, a CD-ROM, or through the transmission of a data feed. The numerical values of the chronological set are used in the said algorithm in order to construct a dense network of curves constituting the topological structure of the said set.

The algorithm, as defined further on, uses regressions of order D (degree D), which are known mathematical tools. The algorithm can use any of the following regressions of the order D:

Regression of order zero, otherwise known as average;
First order regression, otherwise known as linear regression;
Second order regression, otherwise known as quadratic regression;
Regression of order D greater than 2.

To simplify its expression, the algorithm will be described for, but not limited to, the case of linear regressions.

To construct the network of N curves relating to the chronological set of M values and ending at abscissa $x_0$, it suffices to perform the following algorithm No. 1, in which:

$x_0$ is the last abscissa (the most recent) of the chronological set of values;
M is the number of values of the chronological set up to abscissa $x_n$;
N is a parameter representing a chosen number of curves in the network of curves;
$n_1$, the first term of the set $\{n_1, \ldots, n_k, \ldots, n_N\}$, is the number of values used for the regressions allowing the construction of curve C1 of the network;
$n_N$, the last term of the set $\{n_1, \ldots, n_k, \ldots, n_N\}$, is the number of values used for the regressions allowing the construction of curve CN of the network;
a is a parameter;
$n_k$ is given by the algebraic formula [1] listed in the appendix.

The algebraic formula [1] serves to calculate $n_k$, the rounded integer of which represents the number of consecutive values ("principal parameter") used for each linear regression of rank k. In the algebraic formula, $n_1$, $n_N$ and a are chosen beforehand based on criteria Q described further on.

Algorithm No. 1
Loop 1: for s=1 to N
  Calculation of $n_s$ with the algebraic formula [1];
  p=rounded integer of $n_s$;
  Loop 2: for j=0 to M−p
    Determination of coefficients $\alpha_j$ and $\beta_j$ of the linear regression function $y=j+\alpha_j+\beta_j$ on the set of the p values of abscissas $x_{-j-p+1}$ to $x_{-j}$;
    Memorization of the terminal point of coordinates ($x_{-j}$, $\alpha_j+\beta_j x_{-j}$) of the regression straight line;
    Optionally, if j>0, one can already generate a segment, for example, a straight line segment, joining the terminal point of the ongoing iteration of coordinates ($x_{1-j}$, $\alpha_{j-1}+\beta_{j-1} x_{1-j}$) and the terminal point of the previous iteration ($x_{-j}$, $\alpha_j+B_j x_{-j}$);
  When j=M−p, one goes back to loop 1;
  When s=N, the algorithm ends.

The algorithm No. 1 comprises a regression calculator (calculation of each regression and, optionally, generation of segments) and a controller which determines the regressions with the use of algebraic formula [1].

The algorithm No. 1 provides a network of curves (discontinuous or continuous in the case where the option present in loop 2 is chosen) forming a topological structure in which characteristic figures that are useful for the prediction can manifest. The curves can be visualized using different colors.

Figure 2:
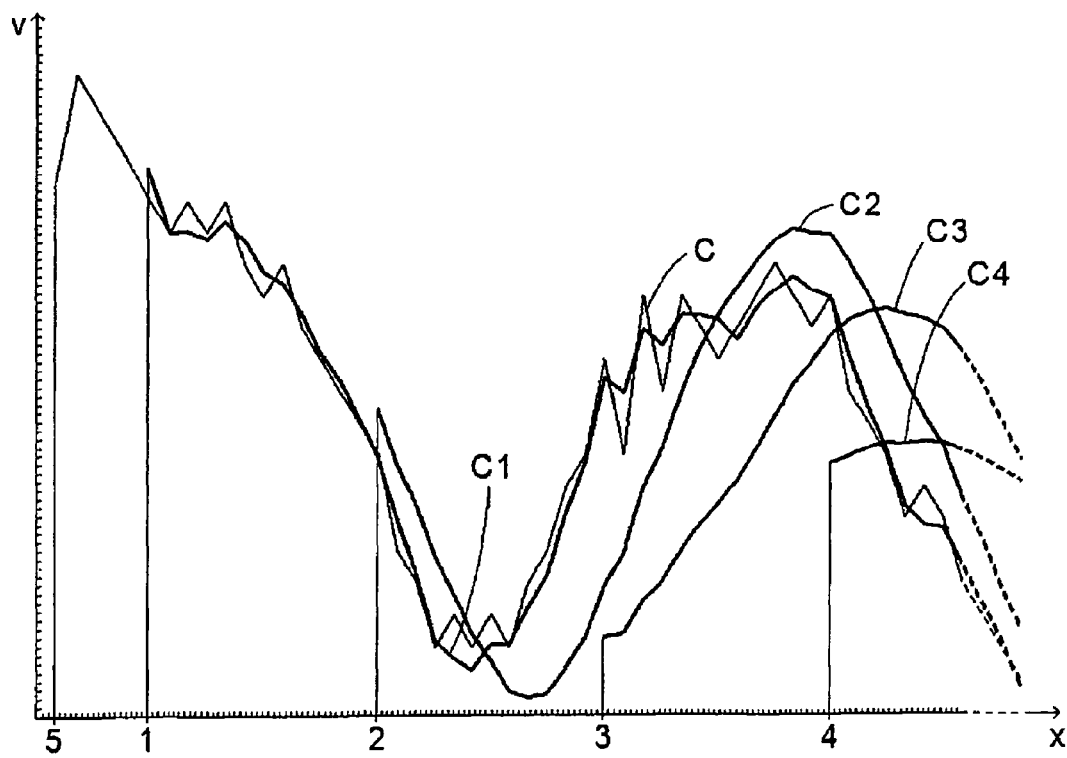
FIG. 2 represents the construction of four curves C1, C2, C3 and C4 based on linear regressions on values of the set represented by curve C.

FIG. 2, described hereafter, given as an example, allows a better understanding of algorithm No. 1.

The abscissas numbered 1, 2, 3, 4 and 5 represent respectively the abscissas $x_{-M+p(1)}$, $x_{-M+p(2)}$, $x^{-M+p(3)}$, $x_{-M+p(4)}$ of the first points of each of the curves (C1, C2, C3, C4) and the abscissa $X_{-M+1}$ of the first value of the set of values.

The display of a network of curves based on linear regressions, using, for example, N=150, $n_1$=6, $n_N$=2500 et a=12 and a large enough number M of values (M greater than $n_N$ plus the number of abscissas displayed) allows characteristic figures of the following three types to be observed:

Cords;

Envelopes;

Boltropes.

A cord is a pronounced condensation of curves that stands out from a less dense background of curves of the network.

An envelope outlines the boundary of a group of curves of the network.

A boltrope is both a cord and an envelope.

The marked presence of characteristic figures in the topological structure is ensured by the following criteria Q:

I. The network must be dense, that is, the number N of curves of the network must be sufficiently large. In practice, this number must be greater than about 20. In order for these characteristic figures to be better observed, ideally, this number must be greater than 100.

II. The set $\{n_1, \ldots, n_N\}$ of the values $n_k$ of the principal parameter must extend over a sufficiently large range.

III. The distribution of the values must be such that the corresponding network has a uniform density on average, from the representative curve of the set of values up to $C_N$. One will see in practice that a is equal to around $n_2 - n_1$.

In practice, criterion MI is satisfied when the values of the set grow slowly and uniformly. Furthermore, one can slightly modify the density, for example, by making the network denser for smaller values of the principal parameter. Algebraic formula [1] used in algorithm No. 1 allows the values of the principal parameter of the set to be determined with more than sufficient precision, including the case where one wants to modify the density. Algebraic formula [1] is valid under the condition:

$$n_N - n_1 > (N-1)a$$

The algorithm can be simplified by using a predefined set of values of the principal parameter, for example, $\{6, 18, 30, 42, 55, \ldots, 2415, 2436, 2457, 2479, 2500\}$.

Algorithm No. 1 can be formulated differently as long as it leads to the construction of N curves relating to the chronological set of M values. For example, the iteration in loop 2 can be performed in the opposite direction, using growing indices of the abscissas of the values of the chronological set. In this case, algorithm No. 2, described later on, can be skipped.

By keeping in memory the point $(x_{-j+\epsilon}, \alpha_j + \beta_j x^{-j+\epsilon})$ in algorithm No. 1, where $\epsilon$ is a positive integer, instead of the end point $(x_{-j}, \alpha_j + \beta_j x_{-j})$, the resulting network of curves is shifted to the right. It has been observed that such a shifted network is less pertinent.

Using a regression of any order D, the straight line of the linear regression in algorithm No. 1 is replaced by a regression curve expressed as $y = \alpha_j + \beta_j x + \gamma_j x^2 + \delta_j x^3 \ldots$. The calculation of the regression curve of order D is also a well-known mathematical operation.

Linear regression calculations in the algorithm are simpler when the consecutive abscissas are equidistant.

The reasons for which algorithm No. 1 was described using linear regressions are the following:

It has been observed that the networks of curves based on averages do not, in general, generate characteristic figures;

The networks of curves based on quadratic regressions and the ones based on regressions of order D greater than 2 require more computational power.

Figure 3:
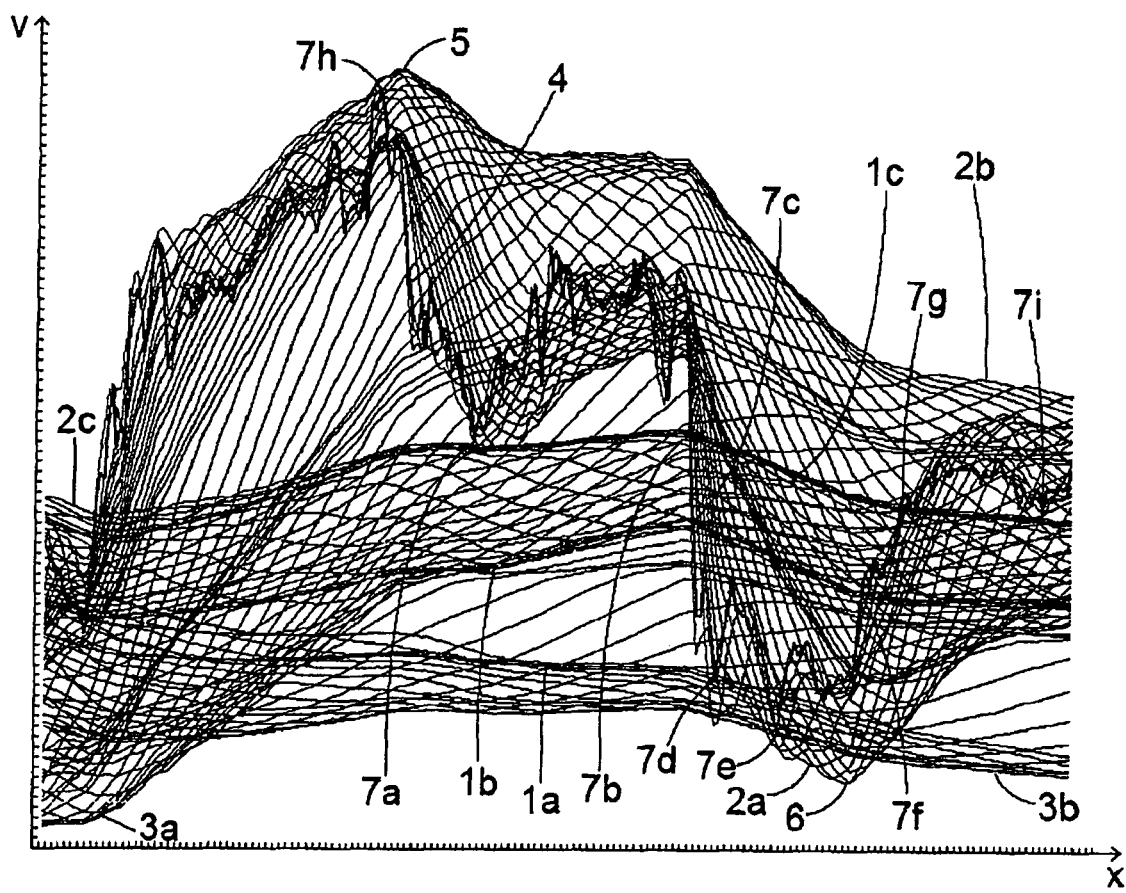
FIG. 3 represents a network of curves based on linear regressions.

FIG. 3, described hereafter, provided as a non-limiting example, allows a better understanding of the system.

In FIG. 3, which represents a network of curves based on linear regressions, one can see characteristic figures containing cords 1a, 1b, 1c, envelopes 2a, 2b, 2c, boltropes 3a, 3b and the representative curve of the set of values 4, in the form of a continuous curve.

The representative curve of the set of values, can be any of the following representations given as non-limiting examples:

The set of the points representing the chronological set of values;

The continuous curve obtained by joining the contiguous points of the chronological set of values by a straight line segment;

The set of the points representing the values of the chronological set accompanied by their dispersions.

The prediction of the future of the chronological set is based on the examination, over a sufficiently large range of abscissas, of the cords, the envelopes, the boltropes and the representative curve of the chronological set of values. For the range to be considered sufficiently large, it suffices that the corresponding part of the topological structure contains a peripheral characteristic figure showing a maximum on the upper part of the network and a peripheral characteristic figure showing a minimum on the lower part of the network. For example, in FIG. 3, the network contains on the upper part a peripheral characteristic figure presenting a maximum 5 and on the lower part a peripheral characteristic figure presenting a minimum 6.

The examination is aimed at determining, by analogy with past topological structures, what is, at abscissa $x_0$, the "attractive-repulsive" effect of the characteristic figures on the representative curve of the chronological set of values, without figure-crossing 7a, 7d, 7e, 7h, 7i and with figure-crossing 7b, 7c, 7f, 7g.

A characteristic figure will attract-repulse the representative curve of the chronological set of values according to its type, its shape and its position in relation to the said representative curve. The examination of FIG. 3, given as an example, allows a better understanding of how the representative curve 4 is successively attracted-repulsed by:

Envelope 5 without envelope-crossing (7h);

Cord 1c without cord-crossing (7a);

Cord 1c with cord-crossing (7b);

Cord 1b with cord-crossing (7c);

Cord 1a without cord-crossing (7d);

Boltrope 3b without boltrope-crossing (7e);

Cord 1b with cord-crossing (7f);

Cord 1c with cord-crossing (7g);

Cord 1c without cord-crossing (7i).

When the chronological set of values is augmented by a new value of abscissa $x_1$ consecutive to abscissa $x_0$ of the last value of the set, it is not necessary to use algorithm No. 1, applying now to M+1 values up to abscissa $x_1$. To complete the initial network, it suffices to use the algorithm described as follows.

Algorithm No. 2

Loop: for s=1 to N

Calculation of $n_s$ by the algebraic formula [1];

p=rounded integer of $n_1$;

Determination of linear regression straight line $y = \alpha + \beta x$ on the set of the p values of abscissas $x_{-p+2}$ to $x_1$;

Memorization of the terminal point of coordinates $(x_1, \alpha + \beta x_1)$ of the regression straight line;

Optionally, generation of a straight line segment joining the points of coordinates $(x_0, y_0)$ and $(x_1, \alpha + \beta x_1)$;

When s=N, the algorithm ends.

Algorithm No. 2, like algorithm No. 1, relies on the regression calculator and the controller.

The procedure for assisting prediction using a fictitious prolongation of the chronological set of values may comprise the following steps:

1) Addition of the fictitious values $v_u, v_v, \ldots, v_y, v_z$, of abscissas $x_u, x_v, \ldots, x_y, x^z$, to the chronological set of values, which represent the stages of a plausible future of the chronological set of values;
2) Construction of a new chronological set of values by adjunction of the points obtained by linear interpolation between the points $(x_0, v_0)$ and $(x_u, v_u)$, $(x_u, v_u)$ and $(x_v, v_v), \ldots, (x_y, v_y)$ and $(x_z, v_z)$;
3) Application of algorithm No. 2 in order to prolong the curves of the network from abscissa $x_0$ to abscissa $x_z$;
4) Examination of the topological structure, extended as described above;
5) Determination of the validity of the extended topological structure. Two scenarios can occur:
a) The extended topological structure is valid: the characteristic figures still exist and extend in a natural manner, forming a topological structure analogous to past topological structures. The fictitious values constitute a very plausible approximation of the future of the chronological set of values;
b) The extended topological structure is not valid: the characteristic figures no longer exist or do not extend in a natural manner, thus not forming a topological structure analogous to past topological structures. One then returns to step 1) modifying consequently the fictitious values $v_u, v_v, \ldots, v_y, v_z$.

The addition of a fictitious value $(x, v)$ can be done by pointing, for example, with the help of a mouse, directly next to the image of the network at the corresponding position.

Figure 4:
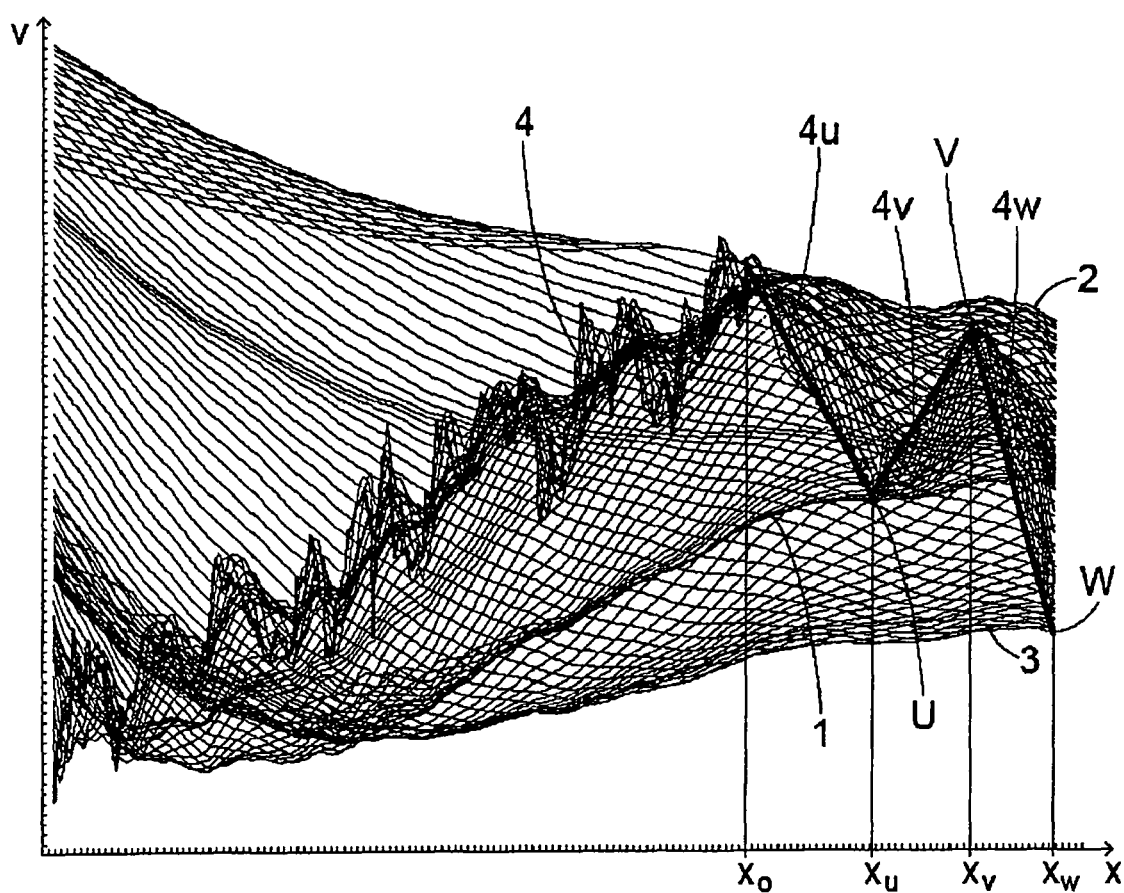
FIG. 4 represents a prolonged topological structure obtained through the procedure for assisting prediction.

FIG. 4 described as follows, given as an example, allows a better understanding of the procedure for assisting the prediction.

FIG. 4 represents a valid case of an extended topological structure resulting from the use of fictitious points U, V, W. The straight line segments $4u$, $4v$ and $4w$ represent a plausible evolution of the representative curve of the chronological set of values starting from abscissa $x_0$. Point U, chosen in order to generate a valid topological extension, is such that cord 1 attracts-repulses, without cord-crossing, the fictitious curve $4u$. Point V, chosen in order to generate a valid topological extension, is such that envelope 2 attracts-repulses, without envelope-crossing, the fictitious curve $4v$. Point W, chosen in order to generate a valid topological extension, is such that cord 1 attracts-repulses, with cord-crossing, and boltrope 3 attracts-repulses (in a non-specified manner) the fictitious curve $4w$.

If each value $v_c$ of the chronological set of values has an associated weight $\mu_c$, it can be taken into account in the construction of the corresponding network.

In algorithm No. 1, the following changes are made:
$\phi$ is calculated with formula [2] in the appendix;
For calculating the linear regression, each value $v_i$ is replaced by $v_i \mu_i \phi$, with $i \in \{-j-p+1, -j\}$
In algorithm No. 2, the following changes are made:
$\phi$ is calculated with formula [3] in the appendix;
For calculating the linear regression, each value $v_i$ is replaced by $v_i \mu_i \phi$, with $i \in \{-p+2, 1\}$.

The readability of the said image can be improved by using different colors for the different curves.

The system, in a preferred embodiment, given as a non-limiting example, uses the Internet, a data server, a computer such as a personal computer (PC) with a monitor. The steps described in detail in the description of the invention are realized in the form of a software program. The software program includes a part dedicated to data treatments and a part dedicated to graphical display.

The various aspects of the invention comprise at least some of the characteristics summarized as follows:
Algorithm No. 1 comprises: for each one of the N curves $C_s$ of the network, choosing a variable j from 0 to M −p, in determining the regression curve of order $D_y = \alpha_j + \beta_j x + \gamma_j x^2 + \delta_j x^3 \ldots + \xi_j x^D$ on the p values of the set of abscissas $x_{-j-p+1}$ à $x_{-j}$, memorizing the point of the regression curve of coordinates $(x_{-j}, \alpha_j + \beta_j x_{-j} + \gamma_j x_{-j}^2 + \delta_j x_{-j}^3 \ldots + \xi_j x_{-j}^D)$ when j is different from zero, generating a straight line segment joining the points of coordinates $(x_{1-j}, \alpha_{j-1} + \beta_{j-1} x_{1-j} + \gamma_{j-1} x_{1-j}^2 + \delta_{j-1} x_{1-j} \ldots + \xi_{j-1} x_{1-j}^D)$ and $(x_{-j}, \alpha_j + \beta_j x_{-j} + \gamma_j x_{-j}^2 + \delta_j x_{-j}^3 \ldots + \xi_j x_{-j}^D)$ and, when j is equal to M −p, moving to the next curve until the N curves of the network are constructed;
The regressions are of order D equal to or greater than 1;
The values $(p_1, p_2, \ldots, p_N)$ are the rounded integers of the numbers obtained through algebraic formula;
Algorithm No. 2 comprises, for each one of the N curves $C_s$ of the network, determining the regression curve $y = \alpha + \beta x + \gamma x^2 + \delta x^3 \ldots + \xi x^D$ on the p values of the set, of abscissas $x_{-p+2}$ to $x_1$, generating the straight line segment joining the points of coordinates $(x_0, y_0)$ and $(x_1, \alpha + \beta x_1 + \gamma x_1^2 + \delta x^3 \ldots + \xi x_1^D)$;
It is possible to add to the chronological set of values fictitious values $v_u, v_v, \ldots, v_y, v_z$, of abscissas $x_u, x_v, \ldots, x_y, x_z$, constructed by adjunction of the values obtained by interpolation between the values $v_0$ and $v_u$, $v_u$ and $v_v, \ldots, v_y$ and $v_z$ of abscissas $x_1, x_2, \ldots, x_{u-1}, x_{u+1} \ldots x_{z-1}$, on which algorithm No. 1 or No. 2 is applied;
When each value of the chronological set of values has an associated weight, value $v_i$ is replaced for the calculation of each regression by $v_i \mu_i \phi$, in algorithm No. 1 thanks to formula [2] and in algorithm No. 2 thanks to formula [3];
N is greater than 100;
Several colors are used for displaying the curves of the network and the representative curve of the set of values;
The addition of fictitious values can be done by pointing directly next to the image of the network at the corresponding position with the aid of a mouse.

The invention can be applied to prediction in many technical fields. It is particularly suitable for phenomena having a rather strong inertia and a rather strong tendency towards chaotic behavior. This is the case in, but not limited to, the following fields: meteorology, economy, financial markets, seismology, population dynamics, but the invention could also be applied to political science and sociology. The prediction relies upon the analysis of curves, which is here visual, but which could be made automatic.

APPENDIX $$n_k = n_1 + (k-1)a + \frac{k(k-1)}{N(N-1)}[n_N - n_1 - (N-1)a] \quad [1]$$

$$\varphi = \frac{p}{\sum_{-j-p+1}^{-j} \mu_k} \quad [2]$$

$$\varphi = \frac{p}{\sum_{-p+2}^{1} \mu_k} \quad [3]$$

The invention claimed is:

1. A computer system for assisting prediction, comprising:
a memory for storing a chronological set of M numerical values of abscissas $(x_{-M+1}, X_{-M+2}, \ldots, x_{-1}, x_0)$; and
an analyzer for executing data treatments on the chronological set of values for detecting tendencies, wherein the analyzer comprises:
a regression calculator for calculating a regression of a chosen order D, equal or greater than 1, on a part of given length of the chronological set of values, from which a particular point of a regression curve is memorized, wherein the regression calculator is configured to iteratively repeat the regression calculation by shifting the part of the chronological set of values, wherein points obtained from the iterative regression calculation together form a curve,
a controller configured to repeatedly call up the regression calculator, and change the length of the shifted part according to a series $(p_1, p_2, \ldots, p_N)$, the series being such that a corresponding network of curves contains at least 20 curves and has a uniform density on average.

2. The system according to claim 1, wherein, in each regression calculation, the regression calculator is configured to weigh the values on which the regression is applied.

3. The system according to claim 1, wherein the regression calculator is confiugred:
for each one of N curves $C_s$ of the network, to choose a variable j from 0 to M−p,
to determine the regression curve of order $D_{y=\alpha_j+\beta_j x+\gamma_j x^2+\delta_j x^3 \ldots +\xi_j x^D}$ on the set of p values of abscissas $x_{-j-p+1}$ to $x_{-j}$, and
to memorize the point of the regression curve of coordinates $(x_{-j}, \alpha_j+\beta_j x_{-j}+\gamma_j x_{-j}^2+\delta_j x_{-j}^3 \ldots +\xi_j x_{-j}^D)$.

4. The system according to claim 3, wherein, in each regression calculation, $v_i$ is replaced by $v_i \mu_i \phi$, wherein $$\varphi = \frac{p}{\sum_{-j-p+1}^{-j} \mu_k}.$$

5. The system according to claim 3, wherein the regression calculator is further configured to generate a straight line segment joining the points of coordinates $(x_{1-j}, \alpha_{j-1}+\beta_{j-1} x_{1-j}+\gamma_{j-1} x_{1-j}^2+\delta_{j-1} x_{1-j} \ldots +\xi_{1-j}^D)$ and $(x_{-j}, \alpha_{j+\beta_j} x_{-j}+\gamma_j x_{-j}^2+\delta_j x_{-j}^3 \ldots +\xi_j x-j^D)$ and, when j is equal to M−p, the regression calculator is configured to move to a next curve until the N curves of the network are obtained.

6. The system according to claim 1, wherein the regression calculator, for each of the N curves $C_p$ of the network, is configured to determine the regression curve $y=\alpha+\beta x+\gamma x^2+\delta x^3 \ldots +\xi x^D$ on the p values of abscissas $x_{-p+2}$ to $x_1$, and generate straight line segment based on the points of coordinates $(x_0, y_0)$ and $(x_1, \alpha+\beta x_1+\gamma x_1^2+\delta x_1^3 \ldots +\xi x_1^D)$.

7. A system according to claim 6, wherein, in each regression calculation, $v_i$ is replaced by $v_i \mu_i \phi$, wherein $$\varphi = \frac{p}{\sum_{-p+2}^{1} \mu_k}.$$

8. The system according to claim 1, wherein each term of the series $(p_1, p_2, \ldots, p_N)$ is a rounded integer of a number given by $n_k$, wherein $$n_k = n_1 + (k-1)a + \frac{k(k-1)}{N(N-1)}[n_N - n_1 - (N-1)a].$$

9. The system according to claim 1, wherein the abscissa of said particular point of the regression is the abscissa of the last value of the part on which the regression is applied.

10. The system according to claim 1, wherein the regressions are linear regressions.

11. The system according to claim 1, wherein the number of curves of the network is greater than 100.

12. The system according to claim 1, wherein fictitious values $v_u, v_v, \ldots, v_y, v_z$, of abscissas $x_u, x_v, \ldots, x_y, x_z$, are added to the chronological set of values, with which a new chronological set of values is constructed by adjunction of the values obtained by linear interpolation between values $v_0$ and $v_u$, $v_u$ and $v_v, \ldots, v_y$ and $v_z$ of abscissas $x_1, x_2, \ldots, x_{u-1}, x_{u+1}, \ldots, x_{z-1}$, on which the regressions are calculated.

13. The system according to claim 12, wherein the addition of a fictitious value is performed by receiving selection of a portion of the image of the network at the corresponding position.

14. The system according to claim 1, further comprising a display for displaying the curves of the network, wherein several colors are used in the display of the curves of the network and a representative curve of the set of values.

* * * * *